United States Patent
Mullady

(10) Patent No.: US 7,416,431 B2
(45) Date of Patent: Aug. 26, 2008

(54) PIVOTING APPARATUS FOR MATING A POWER SUPPLY WITH A RISER CARD AND METHOD FOR DOING THE SAME

(75) Inventor: Robert K. Mullady, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 119 days.

(21) Appl. No.: 11/533,216

(22) Filed: Sep. 19, 2006

(65) Prior Publication Data
US 2008/0070424 A1 Mar. 20, 2008

(51) Int. Cl.
*H05K 1/18* (2006.01)
(52) U.S. Cl. ..................................... 439/341
(58) Field of Classification Search ............ 439/61, 439/64, 341, 376; 361/785
See application file for complete search history.

(56) References Cited

U.S. PATENT DOCUMENTS

| | | | | |
|---|---|---|---|---|
| 4,151,580 A | * | 4/1979 | Struger et al. | 361/801 |
| 4,869,681 A | * | 9/1989 | Vache et al. | 439/341 |
| 5,043,847 A | * | 8/1991 | Deinhardt et al. | 361/736 |
| 5,326,277 A | * | 7/1994 | Kuramitsu | 439/327 |
| 5,722,845 A | * | 3/1998 | Debortoli et al. | 439/267 |
| 6,347,039 B1 | * | 2/2002 | Lee | 361/760 |

* cited by examiner

*Primary Examiner*—Neil Abrams
(74) *Attorney, Agent, or Firm*—Cantor Colburn LLP; Lily Neff

(57) ABSTRACT

Disclosed is a pivoting apparatus comprising a pivot base defining a connection cavity, a pivot slot including an L-shape, and an alignment slot including a curvature that bulges towards a riser card, a key structure extending from at least one of the riser card and a processor in an electronic enclosure, the key structure being fixedly associated with the connection cavity of the pivot base, and a pivotor rotateably associated with the pivot base and fixedly associated with a power supply, the pivotor including an alignment ramp, an alignment pin, and a pivot pin, wherein the alignment pin is removably disposed in the alignment slot, and the pivot pin is pivotably disposed in the pivot slot. The pivotor (14) supports an electrical connector (50) joined to the supply (32). The connector mates with a riser card (24) mounted in a processor (30) to supply power to the riser card.

3 Claims, 2 Drawing Sheets

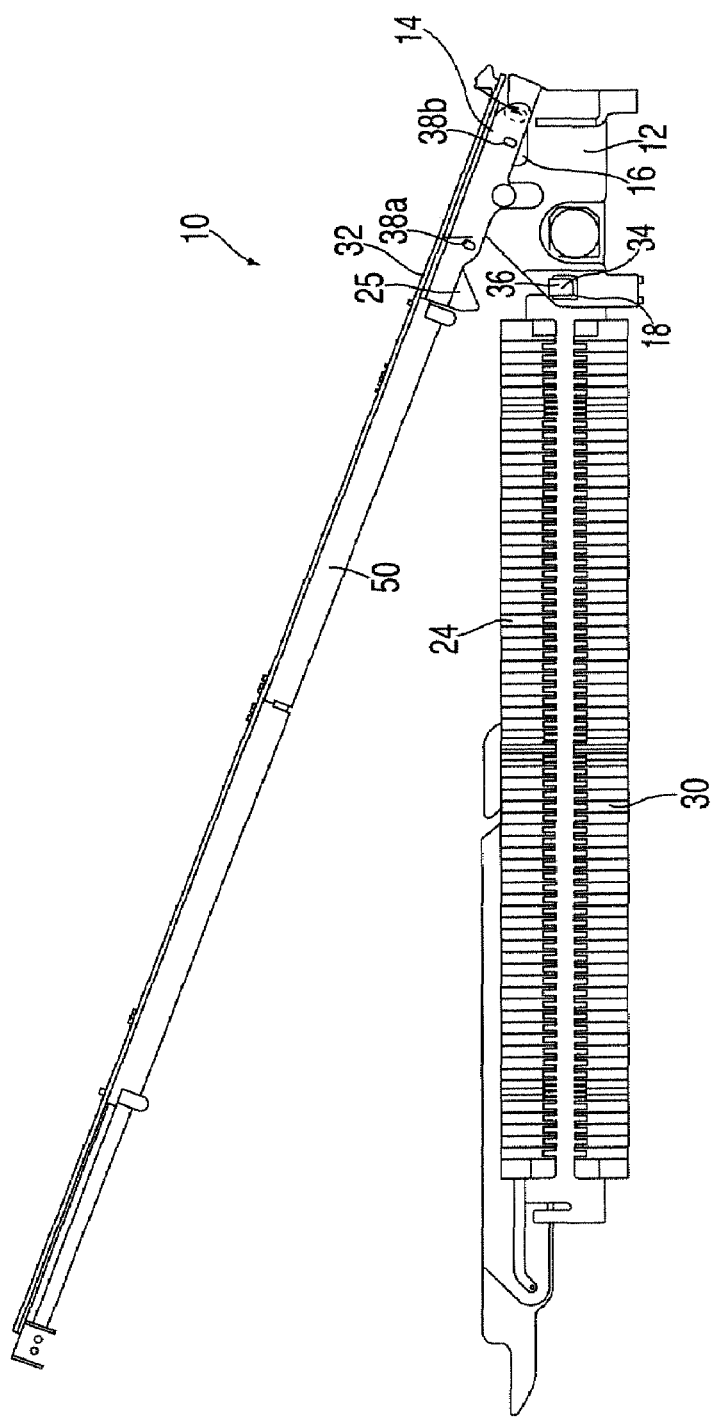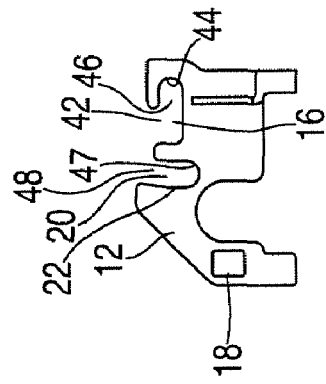

PIVOTING APPARATUS FOR MATING A POWER SUPPLY WITH A RISER CARD AND METHOD FOR DOING THE SAME

BACKGROUND OF THE INVENTION

1. Field of the Invention

The disclosure relates generally to a pivoting apparatus, and more particularly to a pivoting apparatus for mating a power supply with a riser card.

2. Description of Background

Typically the electronic assemblies of an electronic enclosure are mated via a straight on or linear motions. Electronic components such as power supplies and riser cards are examples of components that comprise these electronic assemblies, and are mated via straight on or linear motions. One drawback of this type of mating is the requirement of complete part removal of, for example, the power supply, when access to the power supply or riser card to which it is mated is desired for procedures such as part maintenance. Another drawback for the power supply is that power is fed through a single linear connection, which limits connector size and power distribution on the mating board.

SUMMARY OF THE INVENTION

Disclosed is a pivoting apparatus comprising a pivot base defining a connection cavity, a pivot slot including an L-shape, and an alignment slot including a curvature that bulges towards a riser card, a key structure extending from at least one of the riser card and a processor in an electronic enclosure, the key structure being fixedly associated with the connection cavity of the pivot base, and a pivotor rotateably associated with the pivot base and fixedly associated with a power supply, the pivotor including an alignment ramp, an alignment pin, and a pivot pin, wherein the alignment pin is removably disposed in the alignment slot, and the pivot pin is pivotably disposed in the pivot slot. Also disclosed is a method for mating and disengaging a power supply with a riser card, the method comprising rotatingly associating the power supply with the riser via a pivoting apparatus.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 is a side view of a pivoting apparatus;

FIG. 2 is a side view of a pivot base;

DETAILED DESCRIPTION OF THE INVENTION

Figure 3:
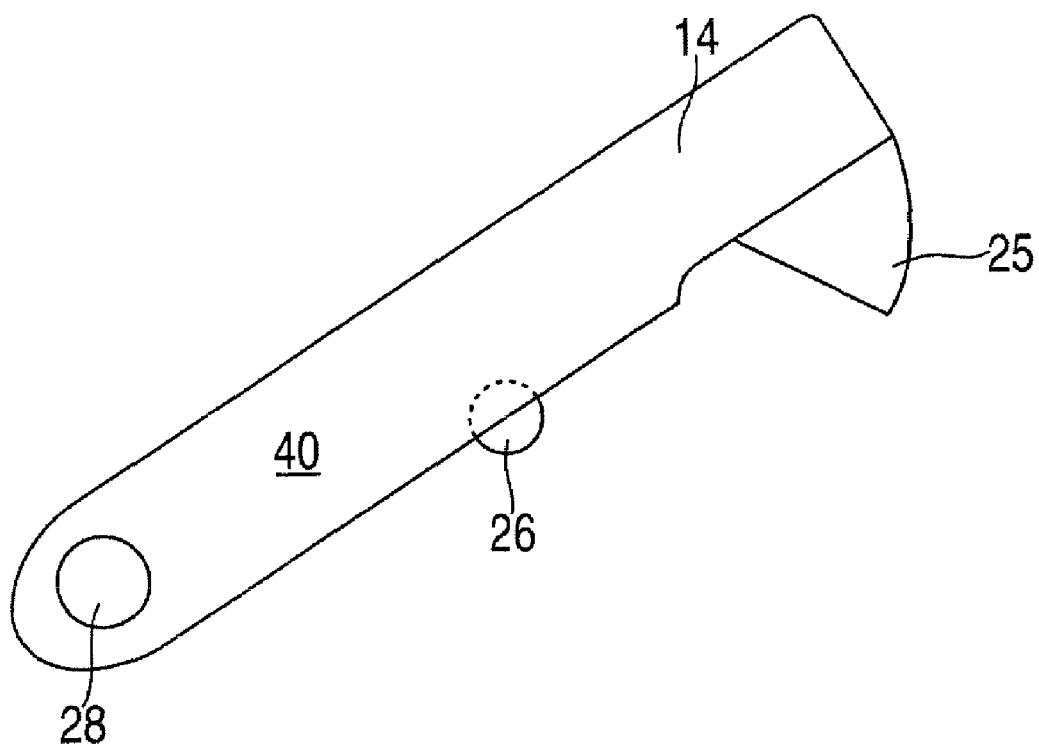
FIG. 3 is a side view of a pivotor.
Figure 4:
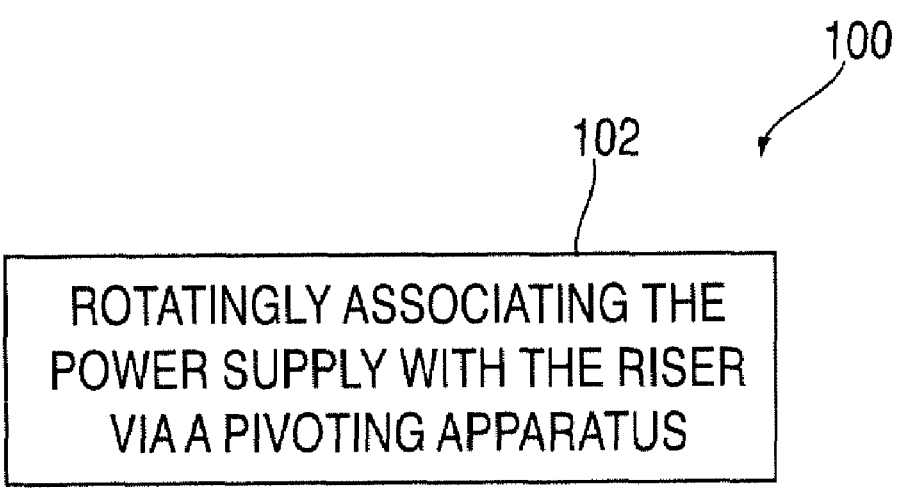
FIG. 4 is a block diagram illustrating a method for mating and disengaging a power supply with a riser card.

Referring to FIGS. 1-3, a pivoting apparatus 10 is illustrated and includes a pivot base 12 that is rotateably associated with a pivotor 14. The pivot base 12 defines an L-shaped pivot slot 16, a connection cavity 18, and an alignment slot 20, wherein the alignment slot 20 includes a curvature 22 that bulges in the direction of a riser card 24 (the riser card 24 being discussed in greater detail further along in the disclosure). The pivotor 14 includes an alignment ramp 25, an alignment pin 26, and a pivot pin 28. The pivot base 12 is fixedly associable with the riser card 24 and/or a processor 30, and the pivotor 14 is fixedly associable with a power supply 32.

The association between the pivot base 12 and/or riser card 24 is achieved via a key structure 34 that extends from either of the riser card 24 and the processor 30, and locks into fixed association with the base 12. The key structure 34 may lock into association with the pivot base 12 via disposal of an L-shaped portion 36 of the key structure 20 through the connection cavity 18. A threaded instrument (not illustrated) may be further screw the L-shaped portion 36 into threaded association with the base 12. In addition, as was mentioned above, the pivotor 14 is fixedly associable with the power supply 32. This association may be achieved via threaded instruments 38a-b.

As was also briefly mentioned above, the pivot base 12 and pivotor 14 are rotateably associated with each other. This rotateability of the components is achieved via removable disposal of the alignment pin 26 of the pivotor 14 within the alignment slot 20 of the pivot base 12, and removable/pivotable disposal of the pivot pin 28 of the pivotor 14 within the pivot slot 16 of the pivot base 12. The pivot pin 28 extends from a pivot pin surface 40 of the pivotor 14. The pivot pin 28 is disposed in pivot slot 16 via a pivot slot opening 42, and moved to an end 44 of a horizontal portion 46 of the L-shaped pivot slot 16. Disposal of the pivot pin 28 within the pivot slot 28 would allow 360-degree rotation of the pivotor 14 about the pivot pin 28 in relation to the pivot base 12 if the alignment pin 26 were removed.

However, since the alignment pin 26 does extend from the pivotor 14, rotation of the pivotor 14 towards the riser card 24 and processor 30 can only continue until the alignment pin 26 contacts the pivot base 12. When the pivot pin 28 is positioned at the end 44 of the horizontal portion 46 of the pivot slot 16, this contact will occur at a relative bottom end 47 of the alignment slot 20, with the alignment pin 26 entering the alignment slot 20 via an alignment opening 48, and following the curvature 22 of the alignment slot 20 (via a rotating motion of the pivotor 14) to the relative bottom end 47 of the alignment slot 20.

Substantially simultaneously to contact between the alignment pin 26 and bottom end 47 of the alignment slot 20 via rotation of the pivotor 14, the alignment ramp 25 abuts the riser card 24. This abutment allows the pivotor 14 to align with the riser board 24. When the pivotor 14 is rotated to a point where the alignment ramp abuts the riser card and the alignment pin 26 reaches the bottom end 47 of the alignment slot 20, a connector 50 associated with the power supply 32 is allowed mate with the riser board 24. This mating of the power supply 32 with the riser board 24, via pivoting/rotation of the power supply 32 (via the apparatus 10), provides power to the riser board 24 and processor 30. The pivoting apparatus 10 also allows the power supply 32 to be removed from this mating via pivoting/rotation, allowing convenient access to the parts (i.e. the power supply 32, riser card 24, processor 30, and memory DIMM's) for procedures such as maintenance.

Referring to claim 4, a method 100 for mating and disengaging a power supply 32 with a riser card 24 is illustrated and includes rotatingly associating the power supply 32 with the riser 24 via a pivoting apparatus 10, as shown in operational block 102. The method 100 may further include rotating the power supply 32 towards the riser 24 via the associating, and rotating the power supply 24 away from the riser 24 via the associating.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A pivoting apparatus comprising:
   a pivot base defining a connection cavity, a pivot slot including an L-shape, and an alignment slot including a curvature that bulges towards a riser card;
   a key structure extending from at least one of said riser card and a processor in an electronic enclosure, said key structure being fixedly associated with said connection cavity of said pivot base; and
   a pivotor rotateably associated with said pivot base and fixedly associated with a power supply, said pivotor including an alignment ramp, an alignment pin, and a pivot pin,
   wherein said alignment pin is removably disposed in said alignment slot, and said pivot pin is pivotably disposed in said pivot slot.

2. The apparatus of claim 1, further including a connection piece fixedly associated with said power supply, said connection piece allowing said power supply to be mateable with said riser card.

3. The apparatus of claim 1, wherein said pivot base is fixedly associated with said power supply via at least one threaded instrument.

* * * * *